(12) United States Patent
Lee et al.

(10) Patent No.: US 8,930,079 B2
(45) Date of Patent: Jan. 6, 2015

(54) SYSTEMS AND METHODS FOR DRIVER INTERVENTION IN AN AUTOMATIC STEERING SYSTEM

(75) Inventors: Yong H. Lee, Troy, MI (US); Jihan Ryu, Rochester Hills, MI (US); Weiwen Deng, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1108 days.

(21) Appl. No.: 12/604,034

(22) Filed: Oct. 22, 2009

(65) Prior Publication Data

US 2011/0098890 A1 Apr. 28, 2011

(51) Int. Cl.
*G05D 3/12* (2006.01)
*B62D 6/00* (2006.01)
*B62D 1/28* (2006.01)

(52) U.S. Cl.
CPC ...................... *B62D 1/286* (2013.01)
USPC ........ 701/42; 701/41; 701/36; 701/1; 701/59; 180/446

(58) Field of Classification Search
CPC ......... B62D 15/025; B60T 7/22; B60T 40/08; B60W 2520/125; B60W 50/14
See application file for complete search history.

(56) References Cited

U.S. PATENT DOCUMENTS

| | | | |
|---|---|---|---|
| 7,835,836 B2 * | 11/2010 | Bolourchi et al. | 701/41 |
| 8,024,091 B2 * | 9/2011 | Takenaka et al. | 701/48 |
| 8,095,271 B2 * | 1/2012 | Lee | 701/41 |
| 2008/0109134 A1 * | 5/2008 | Bolourchi et al. | 701/41 |
| 2008/0255727 A1 * | 10/2008 | Lee | 701/41 |
| 2008/0306655 A1 * | 12/2008 | Ukai et al. | 701/42 |
| 2009/0091435 A1 * | 4/2009 | Bolourchi | 340/435 |

* cited by examiner

*Primary Examiner* — Helal A Algahaim
*Assistant Examiner* — Paul Castro
(74) *Attorney, Agent, or Firm* — Mickki D. Murray; Parks Wood LLC

(57) ABSTRACT

A vehicle steering system includes an automatic steering control unit configured to control the vehicle steering system when in an automatic operational state and a driver intervention unit is configured to determine driver intervention during the automatic operational state. The driver intervention unit comprising a decision software module configured to determine driver intervention.

13 Claims, 3 Drawing Sheets

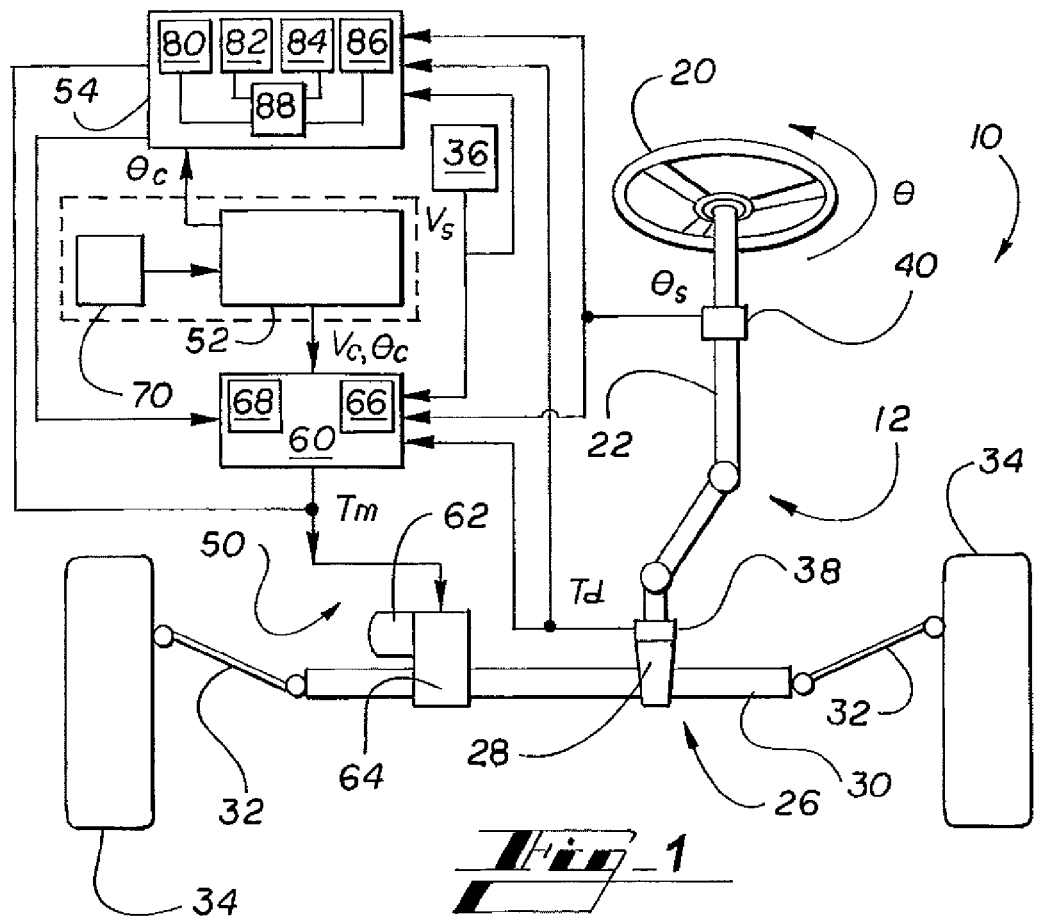
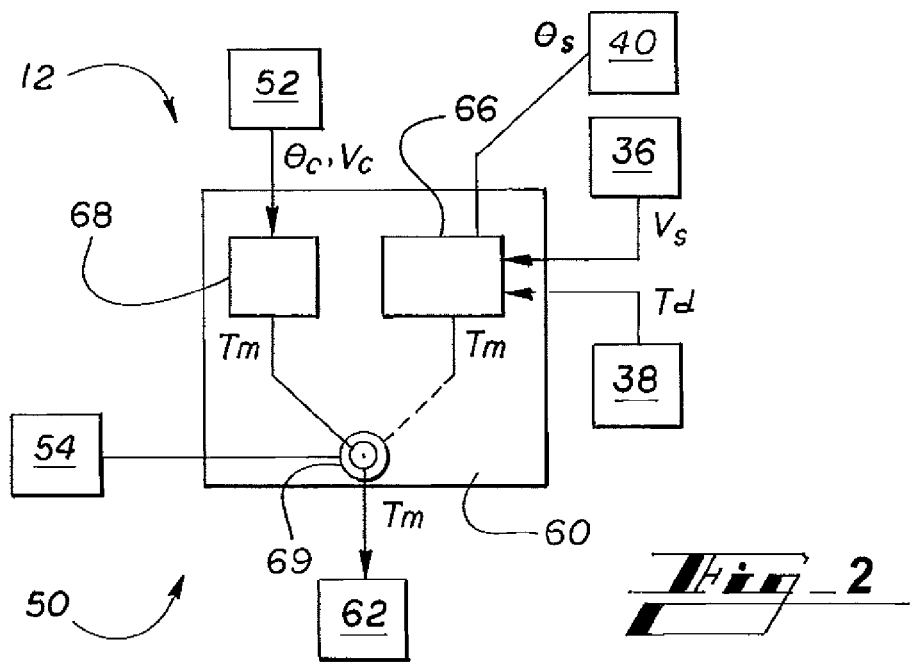

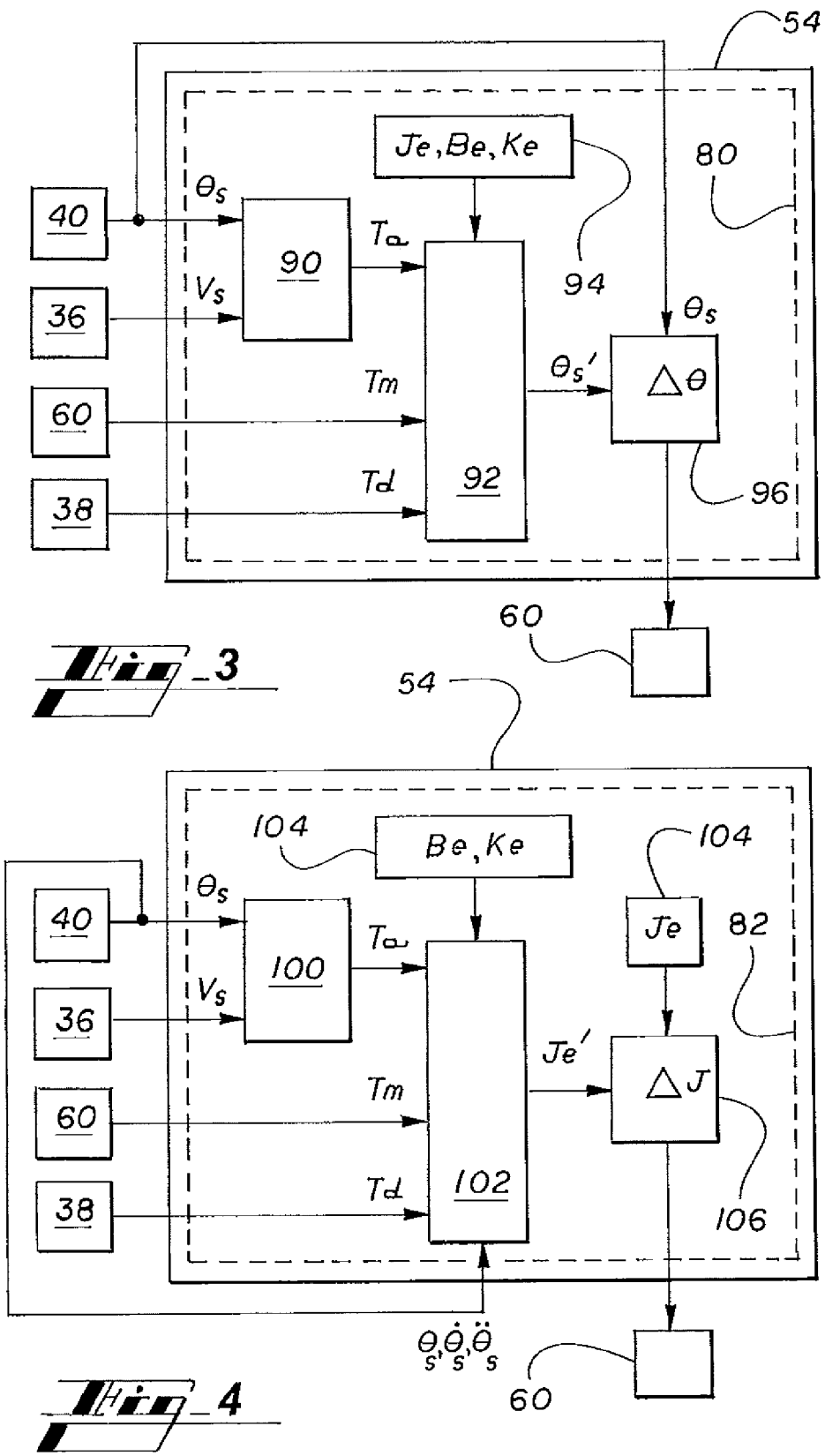

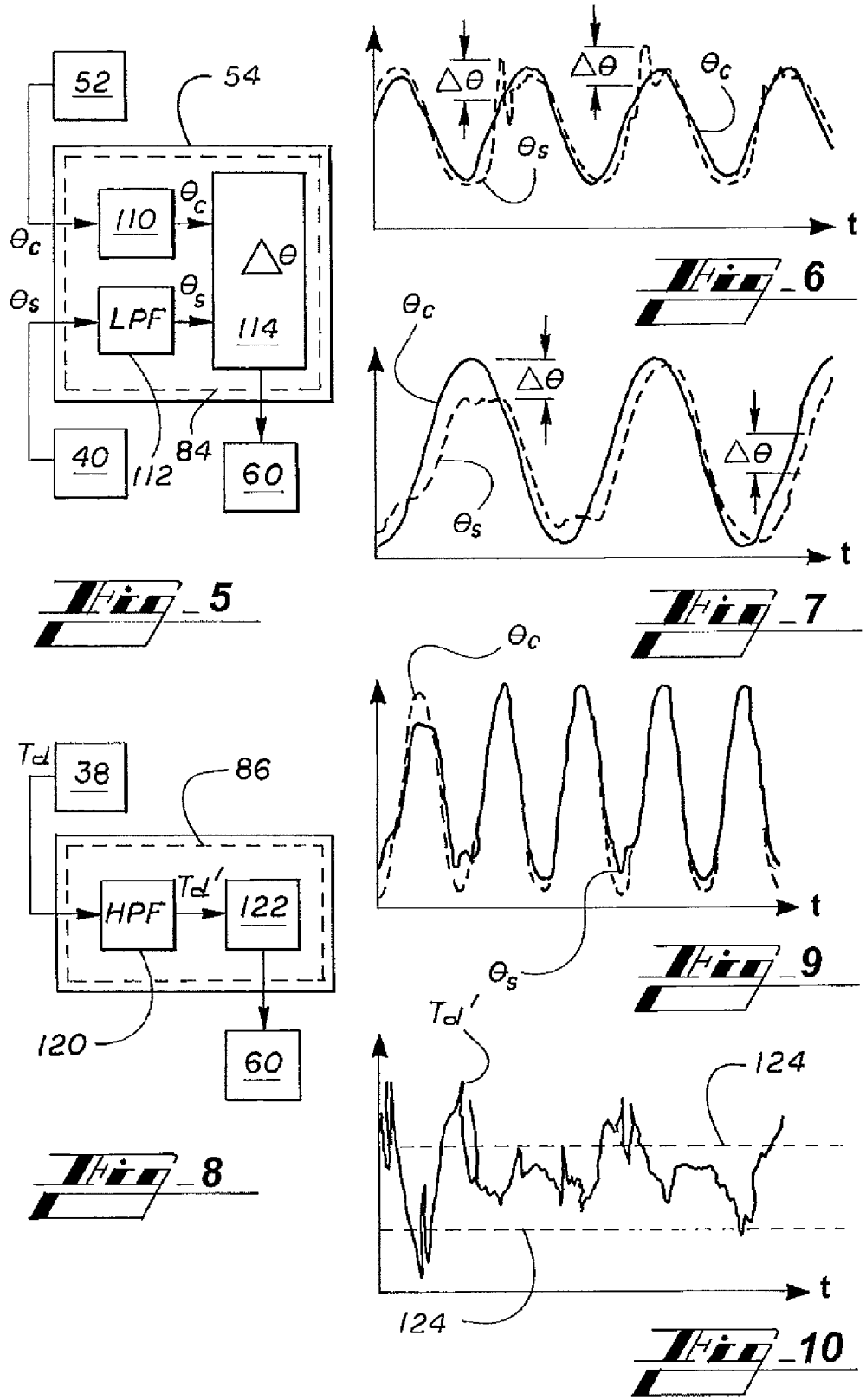

SYSTEMS AND METHODS FOR DRIVER INTERVENTION IN AN AUTOMATIC STEERING SYSTEM

TECHNICAL FIELD

The technical field relates generally to systems and methods for automatically steering a vehicle and, more specifically, to systems and methods for driver intervention.

BACKGROUND

For vehicles incorporating semi-automatic and fully-automatic steering systems and methods, the transition from vehicle controlled steering to driver controlled steering is difficult. For example, during automatic operation by a vehicle that uses an electronic power steering (EPS) system, the driver is typically instructed to remove hands from the steering wheel or to hold the steering wheel loosely, because the EPS system exerts significant torque on the steering wheel as it steers the vehicle. When the driver wants to override automatic steering operation and take control of the vehicle, grasping the steering wheel is an intuitive device for the driver to signal intent to commandeer control of the vehicle. However, large torque on the steering wheel by the EPS system inhibits driver intervention via the steering wheel. Further, in instances where driver intervention requires little or no torque, may not be detected by a torque sensor measuring the torque on the steering wheel because the torque sensor may not distinguish driver intervention from noise. As such, detecting driver intervention in a timely and reliable manner remains a difficult task.

SUMMARY

The shortcomings of the prior art are overcome by providing systems and methods for driver intervention of automatic steering processes that are configured to detect driver intervention when the driver applies, in relative terms, little or no torque to the steering wheel. The systems and methods taught herein enable a driver intervention detection system to be sensitive enough so that drivers need not apply a large steering torque before the intervention is detected.

According to a first exemplary embodiment, a vehicle steering system includes a steering angle sensor configured to measure a steering angle, an automatic steering control unit configured to control the vehicle steering system when in an automatic operational state, and a driver intervention unit configured to detect driver intervention during the automatic operational state. The driver intervention unit includes a decision software module configured to determine driver intervention as a function of the measured steering angle and a second steering angle.

According to a second exemplary embodiment, a vehicle steering system includes a memory storing a hands-off moment of inertia of the steering system, an automatic steering control unit configured to control the vehicle steering system when in an automatic operational state, and a driver intervention unit configured to detect driver intervention during the automatic operational state. The driver intervention unit includes a decision software module configured to determine driver intervention as a function of the hands-off moment of inertia and a calculated moment of inertia.

According to a third exemplary embodiment, a vehicle steering system includes a torque sensor configured to measure driver torque applied to a steering wheel of the vehicle steering system, an automatic steering control unit configured to control the vehicle steering system when in an automatic operational state, and a driver intervention unit configured to detect driver intervention during the automatic operational state. The driver intervention unit includes a decision software module configured to determine driver intervention as a function of high-frequency noise of the driver torque measured by the torque sensor.

The foregoing has broadly outlined some of the aspects and features of the present disclosure, which should be construed to be merely illustrative of various potential applications. Other beneficial results can be obtained by applying the disclosed information in a different manner or by combining various aspects of the disclosed embodiments. Accordingly, other aspects and a more comprehensive understanding may be obtained by referring to the detailed description of the exemplary embodiments taken in conjunction with the accompanying drawings, in addition to the scope defined by the claims.

DESCRIPTION OF THE DRAWINGS

FIG. 1 is a partial schematic illustration of a vehicle including a steering system according to an embodiment of the present disclosure.

FIG. 2 is a diagram illustrating a motor control unit of the steering system of FIG. 1.

FIG. 3 is a diagram illustrating a decision software module of a driver intervention unit of the steering system of FIG. 1.

FIG. 4 is a diagram illustrating a decision software module of a driver intervention unit of the steering system of FIG. 1.

FIG. 5 is a diagram illustrating a decision software module of a driver intervention unit of the steering system of FIG. 1.

FIG. 6 is a graphical representation of a steering angle command signal and a measured steering angle signal associated with the decision software module of FIG. 5.

FIG. 7 is a graphical representation of a steering angle command signal and a measured steering angle signal associated with the decision software module of FIG. 5.

FIG. 8 is a diagram illustrating a decision software module of a driver intervention unit of the steering system of FIG. 1.

FIG. 9 is a graphical representation of a steering angle command signal and a measured steering angle signal associated with the decision software module of FIG. 8.

FIG. 10 is a graphical representation of high-frequency noise of a measured torque signal associated with the decision software module of FIG. 8.

DETAILED DESCRIPTION

As required, detailed embodiments are disclosed herein. It must be understood that the disclosed embodiments are merely exemplary and may be embodied in various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods being known to those of ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

The illustrated embodiments are described in the context of an electric power steering system although the teachings are applicable to other driver assist systems including hydraulic systems, electro-hydraulic systems, and the like.

Vehicle and Steering System

Referring to FIG. 1, a vehicle 10 includes a steering system 12 including a steering wheel 20, a steering shaft 22, a rack-and-pinion 26 including a first pinion gear 28 and a toothed rack 30, tie rods 32, wheels 34, a speed sensor 36, a steering shaft torque sensor 38, and a steering angle sensor 40. The steering wheel 20 is connected to the steering shaft 22, which is connected to the first pinion gear 28 such that rotary motion of the steering wheel 20 is transferred to the first pinion gear 28. The first pinion gear 28 converts the rotary motion into linear movement of the rack 30. The tie rods 32 connect the rack 30 to the wheels 34 and convert the movement of the rack 30 into rotation of the wheels 34. The torque sensor 38 measures a driver torque $T_d$ applied to the steering wheel 20 and is based on the torsional displacement of steering shaft 22 or torsion bar. Here, the source of the driver torque $T_d$ is the driver and, if the driver's hands are off the steering wheel 20, no driver torque $T_d$ is applied to steering shaft 22. The speed sensor 36 measures a measured vehicle speed $V_s$ of the vehicle 10. The steering angle sensor 40 measures the measured steering angle $\theta_s$ of the steering wheel 20. Generally, the noise of the driver torque $T_d$ measurement is greater than the noise of the measured steering angle $\theta_s$. The steering angle sensor 40 includes a digital encoder that has better accuracy, finer resolution, and less noise than the torque sensor 38.

The steering system 12 further includes an electric power steering (EPS) system 50, an automatic steering control unit 52, and a driver intervention unit 54. The EPS system 50 includes a motor control unit 60 and a motor 62 that drives a second pinion 64 that is coupled to the rack 30. Referring to FIGS. 1 and 2, the motor control unit 60 includes a manual software module 66 and an automatic software module 68. During manual operation, the manual software module 66 determines a motor torque $T_m$ and generates a corresponding drive signal that drives the motor 62 to apply the appropriate torque to the second pinion 64. The motor torque $T_m$ is a function of the measured vehicle speed $V_s$, the measured steering angle $\theta_s$, and the driver torque $T_d$ respectively provided by the speed sensor 36, the steering angle sensor 40, and the torque sensor 38. Here, the motor torque $T_m$ supplements a driver torque $T_d$ applied to the steering wheel 20. During automatic operation, the automatic software module 68 determines a motor torque $T_m$ and generates a corresponding drive signal that drives the motor 62 to apply the appropriate torque to the second pinion 64. Here, the motor torque $T_m$ is a function of a steering angle command $\theta_c$ and a vehicle speed command $V_c$ from the automatic steering control unit 52. The driver intervention unit 54 controls the operational state. As used herein, the "operational state" includes manual operation and automatic operation. As illustrated in FIG. 2, the driver intervention unit 54 controls which software module 66, 68 is the source of the motor torque $T_m$ that is used to generate a drive signal for the motor 62. Alternative steering systems include a hypoid gear rather than a dual pinion arrangement.

For purposes of teaching, the steering system 12 is modeled in a simplified manner with a second order equation: $J_e\ddot{\theta}_s + B_e\dot{\theta}_s + K_e\theta_s = \Sigma T = T_d + T_m - T_a$ where $J_e$ is the equivalent moment of inertia of the steering system 12, $B_e$ is the equivalent damping of the steering system 12, $K_e$ is the equivalent spring rate or stiffness of the steering system 12, $\theta_s$ is the steering wheel angle, $T_d$ is the driver applied steering torque, $T_m$ is the equivalent motor assist torque on steering system 12, and $T_a$ is the equivalent tire alignment torque on steering system 12. The driver torque $T_d$ is measured by the torque sensor 38, the motor torque $T_m$ is determined by the motor control unit 60 as described above, the tire alignment torque $T_a$ is a function of the measured steering angle $\theta_s$ and the measured vehicle speed $V_s$ as described in further detail below, and the stiffness $K_e$, damping $B_e$, and moment of inertia $J_e$ parameters are determined from experimental measurement. The parameters $J_e$, $B_e$, $K_e$ are determined where the steering system 12 is free from driver interaction. In a linear operating region, road surface effect can be ignored when determining tire alignment torque $T_a$.

The equivalent transfer function is $$\frac{\Theta_s(s)}{T(s)} = \frac{K_e\omega_n^2}{s^2 + 2\zeta\omega_n s + \omega_n^2}$$

is where $\zeta$ is the equivalent damping ratio of the steering system 12 and $\omega_n$ is the equivalent natural frequency of the steering system 12.

Automatic Steering Control Unit

Continuing with FIG. 1, the automatic steering control unit 52 is configured to take a desired path and generate a steering angle command $\theta_c$ to move the vehicle 10 along the desired path. The path is provided by a path unit 70 such as a vision system, a global positioning system (GPS) with digital map database, combinations thereof, and the like. The steering angle command $\theta_c$ is used by the automatic software module 68 of the motor control unit 60 to generate a motor torque $T_m$ to steer the vehicle 10 as described above and also by the driver intervention unit 54 as described in further detail below.

Driver Intervention Unit

The illustrated driver intervention unit 54 is configured to control the operational state of EPS system 50. As such, the driver intervention unit 54 can change the operational state from automatic operation to manual operation to allow the driver to take over control of the vehicle 10. Such a change includes instructing a processor 69 to execute the instructions of one of software modules 66, 68 to generate the motor torque $T_m$ as illustrated in FIG. 2. Referring to FIGS. 1, 3, 4, 5, and 8, the driver intervention unit 54 includes one or more decision software modules 80, 82, 84, 86 that are configured to detect driver intervention and, in response, generate instructions to change the operational state of the EPS system 50. The decision software modules 80, 82, 84, 86 and associated methods can be used independently or in combination to determine driver intervention. Programming languages such as C, C++, C#, Java, JavaScript, Perl, PHP, Python, Ruby, and SQL can be used to write the software modules, the instructions of which are executed with a processor 88.

Referring to FIG. 3, the decision software module 80 is configured to detect driver intervention as a function of the measured steering angle $\theta_s$ and a calculated steering angle $\theta_s'$. The decision software module 80 includes an alignment torque module 90 that calculates alignment torque $T_a$ as a function of the measured steering angle $\theta_s$ and the measured vehicle speed $V_s$. The alignment torque $T_a$ can be looked up in a table or chart of experimental data. The decision software module 80 further includes a system model software module 92 that calculates the calculated steering angle $\theta_s'$. Using a function introduced above, the calculated steering angle $\theta_s'$ is given by $$\Theta'_s(s) = T(s)\frac{K_e\omega_n^2}{s^2 + 2\zeta\omega_n s + \omega_n^2}.$$

Each of the following is an input to the system model software module 92: the alignment torque $T_a$ is received from the alignment torque module 90, the motor torque $T_m$ is received from the EPS system 50, the driver torque $T_d$ is measured by the torque sensor 38, and the parameters $J_e$, $B_e$, $K_e$ are accessed from a memory 94.

The decision software module 80 further includes an evaluation module 96 that is configured to determine driver intervention as a function of the measured steering angle $\theta_s$ and the calculated steering angle $\theta_s'$. According to an exemplary method, where a steering angle differential $\Delta\theta$, between the measured steering angle $\theta_s$ and the calculated steering angle $\theta_s'$, exceeds a predetermined magnitude or threshold, driver intervention is detected. The measured steering angle $\theta_s$ and the calculated steering angle $\theta_s'$ can be compared in alternative known manners including taking the ratio of one to the other. In response to detection, the driver intervention unit 54 instructs the motor control unit 60 to transition from automated steering to manual steering and allows the driver to assume control. In the illustrated embodiment, the driver intervention unit 54 selects the manual software module 66 as the source of the motor torque $T_m$. The driver intervention detection method of the decision software module 80 is advantageous as the steering angle differential $\Delta\theta$ is more sensitive to the driver's interaction with the steering wheel 20 than the measurement of the torque sensor 38 for reasons described above.

Referring to FIG. 4, the decision software module 82 is configured to detect driver intervention as a function of the "hands-off" moment of inertia $J_e$ and a calculated moment of inertia $J_e'$ of the steering system 12. The decision software module 82 includes an alignment torque module 100 that calculates alignment torque $T_a$ as a function of the measured steering angle $\theta_s$ and the measured vehicle speed $V_s$. The decision software module 80 further includes a system model software module 102 that determines the calculated moment of inertia $J_e'$. Using the a function introduced above, the calculated moment of inertia $J_e'$ is determined according to $$J_e' = \frac{\left(\sum T\right) - B_e\dot{\theta}_s + K_e\theta_s}{\ddot{\theta}_s}.$$

Each of the following are inputs to the system model software module 102: the alignment torque $T_a$ is received from the alignment torque module 100, the motor torque $T_m$ is received from the EPS system 50, the driver torque $T_d$ is measured by the torque sensor 38, and the parameters $B_e$, $K_e$ are accessed from a memory 104. Generally, the driver's interaction with the steering wheel 20 changes or is reflected in the model parameters of the steering system 12. As such, the calculated moment of inertia $J_e'$ takes into account the effect on the "hands-off" moment of inertia $J_e$ caused by a driver's hands on the steering wheel 20.

The decision software module 82 further includes an evaluation module 106 that is configured to determine driver intervention as a function of the "hands-off" moment of inertia $J_e$ and the calculated moment of inertia $J_e'$. According to an exemplary method, where the differential $\Delta J$ between the "hands-off" moment of inertia $J_e$ and the calculated moment of inertia $J_e'$ exceeds a predetermined magnitude or threshold, driver intervention is detected. In response to detection, the driver intervention unit 54 instructs the motor control unit 60 to transition from automated steering to manual steering and allows the driver to assume control, as described above. An advantage of the method of the decision software module 82 is that change in the moment of inertia differential $\Delta J$ is sensitive to driver intervention. Driver intervention can be detected when little or no driver torque $T_d$ is applied to the steering wheel 20.

Referring to FIGS. 5-7, the decision software module 84 is configured to detect driver intervention is as a function of the measured steering angle $\theta_s$ signal and the steering angle command $\theta_c$ signal. The decision software module 84 includes a signal delay module 110 and a low pass filter 112. The signal delay module 110 adjusts the delay of the steering angle command $\theta_c$ signal such that the steering angle command $\theta_c$ signal and the measured steering angle $\theta_s$ signal are in phase. The low pass filter 112 removes the high-frequency noise from the measured steering angle $\theta_s$ signal. The resulting steering angle signals $\theta_s$, $\theta_c$ are shown for two instances in FIGS. 6 and 7.

The decision software module 824 further includes an evaluation module 114 that is configured to determine driver intervention as a function of the resulting steering angle signals $\theta_s$, $\theta_O$. According to an exemplary method, where the steering angle differential $\Delta\theta$ exceeds a predetermined magnitude or threshold, driver intervention is detected. Steering angle differentials $\Delta\theta$ are shown for various times in FIGS. 6 and 7. In response to detection, the driver intervention unit 54 instructs the motor control unit 60 to transition from automated steering to manual steering and allows the driver to assume control, as described above.

Referring to FIGS. 8-10, the decision software module 86 is configured to detect driver intervention as a function of high-frequency noise Td' of the driver torque $T_d$ signal measured by the torque sensor 38. The decision software module 86 includes a high pass filter 120 and an evaluation module 122. The high-frequency noise Td' signal resulting from the high pass filter 120 is evaluated to determine driver intervention. According to an exemplary method, where the high-frequency noise Td' signal exceeds an upper or lower threshold 124, driver intervention is detected. In response to detection, the driver intervention unit 54 instructs the motor control unit 60 to transition from automated steering to manual steering and allows the driver to assume control, as described above. FIG. 9 illustrates steering angle signals and FIG. 10 illustrates the high frequency noise Td' signal for the same times.

When the driver steers or the driver's hands are on the steering wheel 20, the driver torque $T_d$ signal exhibits increased high frequency magnitudes. When the driver's hands are off the wheel, the "hands-off" noise level can be predetermined via experimentation or estimation during automatic steering when there is no driver interaction with the steering wheel 20. The threshold 124 is determined as a function of the "hands-off" noise level.

The above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A method, for performance by a tangible device at a vehicle comprising a steering angle sensor, for controlling a vehicle steering system of the vehicle, the method comprising:
  receiving, by the tangible device comprising a processor executing instructions stored on a non-transitory computer-readable medium of the tangible device, a measured steering angle obtained by the steering angle sensor of the vehicle;
  calculating, by the tangible device executing the instructions stored on a non-transitory computer-readable medium of the tangible device, a moment of inertia, yielding a calculated moment of inertia, according to a relationship amongst factors comprising:
    the measured steering angle;
    an equivalent damping of the vehicle steering system;
    an equivalent stiffness of the vehicle steering system; and
    a torque sum, comprising:
      a driver-applied steering torque;
      an equivalent motor-assist torque; and
      an equivalent tire-alignment torque; and
  determining, by the tangible device executing the instructions stored on a non-transitory computer-readable medium of the tangible device, during an automatic operational state of the vehicle, as a function of a hands-off moment of inertia and the calculated moment of inertia, whether a driver-intervention condition exists;
wherein:
  the relationship is represented by an equation as follows:

$$J'_e = \frac{\left(\sum T\right) - B_e \dot{\theta}_s + K_e \theta_s}{\ddot{\theta}_s}$$

$J_e'$ is the calculated moment of inertia;
  $\theta_s$ is the measured steering angle;
  $B_e$ is the equivalent damping of the vehicle steering system;
  $K_e$ is the equivalent stiffness of the vehicle steering system; and
  $\Sigma T$ is the torque sum, comprising:
    a driver-applied steering torque;
    an equivalent motor-assist torque; and
    an equivalent tire-alignment torque.

2. The method of claim 1, wherein the tangible device comprises the steering angle sensor configured to measure a steering angle, yielding the measured steering angle.

3. The method of claim 2, wherein the tangible device comprises an automatic steering control unit configured to control an electric-power component of the vehicle steering system.

4. The method of claim 2, wherein the tangible device is a part of a driver-intervention unit for use in the vehicle.

5. The method of claim 2, wherein:
  $J_e$ is the equivalent moment of inertia of the vehicle steering system;
  $\theta_s$ is the measured steering angle;
  $B_e$ is the equivalent damping of the vehicle steering system;
  $K_e$ is the equivalent stiffness of the vehicle steering system;
  $\Sigma T$ is the torque summary;
  $T_d$ is the driver-applied steering torque;
  $T_m$ is the equivalent motor-assist torque;
  $T_a$ is the equivalent tire-alignment torque;

an equivalent transfer function, providing a relationship between the measured steering angle ($\theta_s$) and the equivalent stiffness of the vehicle steering system ($K_e$), is as follows:

$$\frac{\Theta_s(s)}{T(s)} = \frac{K_e \omega_n^2}{s^2 + 2\zeta\omega_n s + \omega_n^2};$$

$\zeta$ is an equivalent damping ratio of the vehicle steering system; and
  $\omega_n$ is an equivalent natural frequency of the vehicle steering system.

6. A vehicle steering system, for use in a vehicle, comprising:
  a processor; and
  a computer-readable storage device comprising:
    data indicating a hands-off moment of inertia of the vehicle steering system; and
    computer-executable instructions that, when executed by the processor, cause the processor to perform operations comprising:
      calculating a moment of inertia, yielding a calculated moment of inertia, according to a relationship amongst factors comprising:
        a measured steering angle;
        an equivalent damping of the vehicle steering system;
        an equivalent stiffness of the vehicle steering system; and
        a torque sum, comprising:
          a driver-applied steering torque;
          an equivalent motor-assist torque; and
          an equivalent tire-alignment torque; and
      determining, during an automatic operational state of the vehicle, as a function of the hands-off moment of inertia and the calculated moment of inertia, whether a driver-intervention condition exists;
wherein:
  the relationship is represented by an equation as follows:

$$J'_e = \frac{\left(\sum T\right) - B_e \dot{\theta}_s + K_e \theta_s}{\ddot{\theta}_s}$$

$J_e'$ is the calculated moment of inertia;
  $\theta_s$ is the measured steering angle;
  $B_e$ is the equivalent damping of the vehicle steering system;
  $K_e$ is the equivalent stiffness of the vehicle steering system; and
  $\Sigma T$ is the torque sum, comprising:
    a driver-applied steering torque;
    an equivalent motor-assist torque; and
    an equivalent tire-alignment torque.

7. The vehicle steering system of claim 6, further comprising an automatic steering control unit configured to control an electric-power component of the vehicle steering system.

8. The vehicle steering system of claim 6, further comprising a steering angle sensor configured to measure a steering angle, yielding the measured steering angle.

9. The vehicle steering system of claim 6, wherein the computer-readable storage device is a part of a driver-intervention unit for use in the vehicle.

10. The vehicle steering system of claim 6, wherein:
$J_e$ is the equivalent moment of inertia of the vehicle steering system;
$\theta_s$ is the measured steering angle;
$B_e$ is the equivalent damping of the vehicle steering system;
$K_e$ is the equivalent stiffness of the vehicle steering system;
$\Sigma T$ is the torque summary;
$T_d$ is the driver-applied steering torque;
$T_m$ is the equivalent motor-assist torque;
$T_a$ is the equivalent tire-alignment torque;
an equivalent transfer function, providing a relationship between the measured steering angle ($\theta_s$) and the equivalent stiffness of the vehicle steering system ($K_e$), is as follows:

$$\frac{\Theta_s(s)}{T(s)} = \frac{K_e \omega_n^2}{s^2 + 2\zeta\omega_n s + \omega_n^2};$$

$\zeta$ is an equivalent damping ratio of the vehicle steering system; and
$\omega_n$ is an equivalent natural frequency of the vehicle steering system.

11. A computer-readable storage device comprising computer-executable instructions that, when executed by a processor, cause the processor to perform, in a vehicle steering system, operations comprising:
calculating a moment of inertia, yielding a calculated moment of inertia, according to a relationship amongst factors comprising:
a measured steering angle;
an equivalent damping of the vehicle steering system;
an equivalent stiffness of the vehicle steering system; and
a torque sum, comprising:
a driver-applied steering torque;
an equivalent motor-assist torque; and
an equivalent tire-alignment torque; and
determining, during an automatic operational state of the vehicle, as a function of a hands-off moment of inertia of the vehicle steering system and the calculated moment of inertia, whether a driver-intervention condition exists;

wherein:
the relationship is represented by an equation as follows:

$$J_e' = \frac{(\sum T) - B_e \dot{\theta}_s + K_e \theta_s}{\ddot{\theta}_s}$$

$J_e'$ is the calculated moment of inertia;
$\theta_s$ is the measured steering angle;
$B_e$ is the equivalent damping of the vehicle steering system;
$K_e$ is the equivalent stiffness of the vehicle steering system; and
$\Sigma T$ is the torque sum, comprising:
a driver-applied steering torque;
an equivalent motor-assist torque; and
an equivalent tire-alignment torque.

12. The computer-readable storage device of claim 11, wherein the computer-readable storage device is a part of a driver-intervention unit for use in the vehicle.

13. The vehicle steering system of claim 11, wherein:
$J_e$ is the equivalent moment of inertia of the vehicle steering system;
$\theta_s$ is the measured steering angle;
$B_e$ is the equivalent damping of the vehicle steering system;
$K_e$ is the equivalent stiffness of the vehicle steering system;
$\Sigma T$ is the torque summary;
$T_d$ is the driver-applied steering torque;
$T_m$ is the equivalent motor-assist torque;
$T_a$ is the equivalent tire-alignment torque;
an equivalent transfer function, providing a relationship between the measured steering angle ($\theta_s$) and the equivalent stiffness of the vehicle steering system ($K_e$), is as follows:

$$\frac{\Theta_s(s)}{T(s)} = \frac{K_e \omega_n^2}{s^2 + 2\zeta\omega_n s + \omega_n^2};$$

$\zeta$ is an equivalent damping ratio of the vehicle steering system; and
$\omega_n$ is an equivalent natural frequency of the vehicle steering system.

* * * * *